US006469635B1

(12) United States Patent
Hudson (10) Patent No.: US 6,469,635 B1
(45) Date of Patent: Oct. 22, 2002

(54) BORE HOLE TRANSMISSION SYSTEM USING IMPEDANCE MODULATION

(75) Inventor: Steven Martin Hudson, Dorset (GB)

(73) Assignee: Flight Refuelling Ltd., Dorset (GB)

( * ) Notice: Subject to any disclaimer, the term of this patent is extended or adjusted under 35 U.S.C. 154(b) by 0 days.

(21) Appl. No.: 09/600,281

(22) PCT Filed: Jan. 15, 1999

(86) PCT No.: PCT/GB99/00129

§ 371 (c)(1),
(2), (4) Date: Jul. 14, 2000

(87) PCT Pub. No.: WO99/37044

PCT Pub. Date: Jul. 22, 1999

Related U.S. Application Data (63) Continuation of application No. PCT/GB99/00129, filed on Jan. 15, 1999.

(30) Foreign Application Priority Data

Jan. 16, 1998 (GB) .............................................. 9801010

(51) Int. Cl.$^7$ .............................................. H04B 13/02
(52) U.S. Cl. .......................... 340/854.4; 367/82; 175/40
(58) Field of Search .......................... 340/854.4, 854.3, 340/855.5; 367/82, 83; 175/40

(56) References Cited

U.S. PATENT DOCUMENTS

| 2,364,957 A | 12/1944 | Douglas | 324/356 |
|---|---|---|---|
| 3,129,394 A | 4/1964 | Long | 333/27 |
| 4,322,728 A | 3/1982 | Ginn | 340/870.38 |
| 4,724,434 A | * 2/1988 | Hanson | 367/82 |
| 5,130,706 A | 7/1992 | Van Steenwyk | 340/854.6 |
| 5,130,950 A | 7/1992 | Orban et al. | 367/34 |
| 5,235,285 A | 8/1993 | Clark et al. | 324/342 |
| 5,278,550 A | 1/1994 | Rhein-Knudson et al. | 340/855.1 |
| 5,339,036 A | 8/1994 | Clark et al. | 324/338 |
| 5,359,324 A | 10/1994 | Clark et al. | 340/854.3 |
| 5,387,767 A | 2/1995 | Aron et al. | 367/25 |

(List continued on next page.)

FOREIGN PATENT DOCUMENTS

GB 2 271 695 A 4/1994

OTHER PUBLICATIONS

Trofimenkoff et all; "Impedance of Tubular Stock At High Frequencies", Can J. Elect. & Comp. Eng., vol. 14,No. 4.,(1989).

(List continued on next page.)

*Primary Examiner*—Michael Horabik
*Assistant Examiner*—Albert K. Wong
(74) *Attorney, Agent, or Firm*—Finnegan, Henderson, Farabow, Garrett, & Dunner, L.L.P.

(57) ABSTRACT

A data transmission system for use in extracting data from a downhole location in a well is disclosed. The well has electrically conductive downhole structure (2,C) which together with an earth return forms a signal circuit which is used to transmit data. A current source (34) is provided at the wellhead for applying a reference signal to the downhole structure (2,C). Effective impedance varying means (48) are located downhole and used for varying the effective impedance of the signal circuit in dependence on data to be transmitted to the wellhead. Monitoring means (35) for monitoring changes in the reference signal caused by varying the effective impedance of the signal circuit are located at the wellhead. Monitoring these changes allows data to be extracted. A separate reference earthing point may be provided for the monitoring means to alleviate the effect of imperfections in the earth connection (S) used to complete the signal circuit.

10 Claims, 8 Drawing Sheets

U.S. PATENT DOCUMENTS

| | | |
|---|---|---|
| 5,448,227 A | 9/1995 | Orban et al. .............. 340/854.4 |
| 5,473,158 A | 12/1995 | Holenka et al. ............. 250/254 |
| 5,484,029 A | 1/1996 | Eddison ....................... 175/73 |
| 5,513,528 A | 5/1996 | Holenka et al. ......... 73/152.03 |
| 5,519,668 A | 5/1996 | Montaron ..................... 367/35 |
| 5,530,359 A | 6/1996 | Habashy et al. ............. 324/338 |
| 5,551,286 A | 9/1996 | Booer ..................... 73/152.45 |
| 5,585,790 A | 12/1996 | Luling ..................... 340/853.8 |
| 5,594,706 A | 1/1997 | Shenoy et al. ................ 367/76 |
| 5,608,215 A | 3/1997 | Evans ..................... 250/269.6 |
| 5,617,926 A | 4/1997 | Eddison et al. ............... 175/61 |
| 5,629,623 A | 5/1997 | Sezginer et al. ............ 324/303 |
| 5,635,711 A | 6/1997 | Sloan et al. ................. 250/254 |

OTHER PUBLICATIONS

Bhagwan et al., "Electric Drill Stem Telemetry", IEEE Transactions on Geoscience and Remote Sensing, vol. GE–20, No. 2, (1982).

Trofimenkoff et al., "Measurement of Resistivity and Permeability of Tubular Stock", Can J. Elect.& Comp. Eng., vol. 18. No. 1 (1993).

\* cited by examiner

BORE HOLE TRANSMISSION SYSTEM USING IMPEDANCE MODULATION

This application is a Continuation of International Application Number PCT/GB99/00129, filed Jan. 15, 1999, the content of which is incorporated herein by reference.

The present invention relates to the transmission of data in the context of pipeline systems, for example, surface, sub-sea or downhole pipelines.

U.S. Pat. No. 5,130,706 discloses an apparatus for transmitting data from a downhole location in a borehole to the surface. A downhole power source is used to apply a signal to an earth-drillstring system at the downhole location. Data is transmitted from the downhole location along the drillstring and is received at the surface.

Systems in which the power requirement for the transmission of data is met from the data transmission location have disadvantages. A large amount of power can be required for transmitting data over the distances typically associated with pipeline systems. Local power supplies, for example batteries, have disadvantages. These disadvantages are more pronounced at inaccessible locations and in particular at downhole locations. The batteries may be 'one-shot' batteries or rechargeable batteries. These have limited life and replacing or recharging can be slow, expensive and wasteful of energy. Further the temperature in the downhole environment can be high and this can reduce life further, cause high self discharge and can cause electrolyte boiling problems.

U.S. Pat. No. 4,322,728 discloses the idea of using a surface based power source to extract data from a downhole location. A current pulse is sent along a wireline to a downhole transducer assembly where the resistance of each transducer is indicative of a quantity to be measured. The resistance level can be detected at the wellhead by monitoring the voltage produced by the current pulse and hence the quantity of interest can be determined. However, the system of U.S. Pat. No. 4,322,728 makes use of a wireline along which the current pulse travels. The use of separate wirelines has disadvantages in terms of expense and susceptibility to damage both during and after installation.

It is an object of the present invention to provide a data transmission system which alleviates at least some of the problems of the prior art.

According to a first aspect of the present invention there is provided a data transmission system for use with a pipeline system having at least one electrically conductive pipe arranged for carrying a fluid comprising, reference signal generating means for applying a reference signal to a signal circuit, effective impedance varying means for varying the effective impedance of the signal circuit in dependence on data to be transmitted, and monitoring means for monitoring changes in the reference signal caused by varying the effective impedance of the signal circuit to thereby extract data, wherein the reference signal generating means is arranged for applying a signal to a pipe in the pipeline system whereby, in use, the signal circuit comprises said pipe.

According to a second aspect of the present invention there is provided a method of data transmission for use with a pipeline system having at least one electrically conductive pipe arranged for carrying a fluid comprising the steps of, generating and applying a reference signal to a signal circuit, varying the effective impedance of the signal circuit in dependence on data to be transmitted, and monitoring changes in the reference signal caused by varying the effective impedance of the signal circuit to thereby extract data, including the steps of using a pipe in the pipeline system as part of the signal circuit and applying the reference signal to said pipe.

This arrangement has the advantage that the high power supply requirement for data transmission can be removed from the location from which data is to be transmitted whilst a separate cable or wireline is not required.

The reference signal generating means and the varying means may be disposed at distinct locations. Typically the power requirements of the reference signal generating means will be high whereas the power requirements of the varying means will be relatively low and so can be more easily met from a battery. The monitoring means and varying means are typically disposed at distinct locations.

The data transmission system may comprise the signal circuit. The signal circuit can comprise a signal channel along which data is transmitted and a return conduction path. The signal channel can comprise the conductive pipe to which the reference signal generating means is connected. The signal circuit can comprise a return conduction path via earth.

In use, one terminal of the reference signal generating means can be connected to the conductive pipe and the other to earth via an earth connection point. Preferably the reference signal generating means comprises a constant current source. This has the advantage that the monitoring means can be decoupled from any imperfections in the earth connection point used to complete the signal circuit.

The monitoring means may be arranged to monitor changes in the potential difference, due to the reference signal, between a terminal of the current source and earth. The monitoring means may be connected across the terminals of the current source. In this case the earth connection used for monitoring changes in potential difference is the same as that used to complete the signal circuit through earth. This has disadvantages because the earth connection point will not be true earth and its potential difference relative to earth will vary as the effective impedance of the signal circuit is varied.

Preferably a separate reference earthing point is provided and the monitoring means is arranged to monitor the potential difference between an output of the current source and the reference earthing point. This has advantages because the signal detected by the monitoring means is not then effected by the changing potential at the earth connection point and consequently noise is reduced. The reference earthing point can be a remote earth.

The monitoring means may comprise a voltage measuring means. One terminal of the voltage measuring means may be connected to the terminal of the current source connected to the conductive pipe and the other terminal of the voltage measuring means may be connected to the reference earthing point.

The current source can be arranged to generate a constant dc current signal.

The signal channel may comprise an isolation joint which electrically isolates adjacent sections of the signal circuit from one another. The isolation joint may be provided in the conductive pipe to electrically isolate one section of the pipe from an adjacent section.

The transmission means may be arranged for use in a well having downhole structure. The pipe to which the reference signal generating means is connected in use can comprise the downhole structure. The advantages of the system are particularly useful in downhole situations because the large power requirement for transmitting data from downhole to the surface can be met from the surface. This is done by locating the reference signal generating at the wellhead and the impedance varying means downhole.

Preferably the downhole structure is treated as a single conducting channel. The downhole structure can comprise a production string and a casing. Preferably the production string and the casing are electrically connected to form the single conducting channel.

It has been found that a system which uses the production string as a signal line and the casing as the return is unsatisfactory in circumstances where the space between the production string and the casing is filled with a high density brine solution for pressure equalisation purposes. The brine solution has a relatively high electrical conductivity. This means that a system relying on the production string and casing to form a circuit is susceptible to extremely high losses due to the conduction path directly from the production string to the casing through the brine solution. Using the downhole structure as a single conducting channel avoids the problems which arise due to the conduction path between the production string and casing which exists when the intervening space is filled with a conductive medium.

The signal circuit can comprise the downhole structure and a return conduction path via earth.

Typically when the downhole structure is disposed in a well, the production string will be positioned so as to have an encased portion disposed within the casing and an exposed portion projecting beyond the casing. Preferably at least part of the exposed portion acts as a distributed earth.

An isolation joint may be provided in the production string. Preferably the isolation joint is provided in the exposed portion of the production string. Preferably a portion of the downhole structure on one side of the isolation joint acts as a distributed earth.

The system is suitable for use in both producing and abandoned wells. The downhole structure may comprise a monitoring section which is arranged to be kept in an abandoned well. The monitoring section can comprise an isolation joint.

In some circumstances a well may include lateral developments in addition to the main bore. The structure of the laterals may or may not be electrically connected to the main bore. If the structures are not electrically connected to the main bore a short range electrical link may be provided. The link may be an inductive link between the structure of the main bore and that of the lateral.

The effective impedance varying means may comprise an isolation joint. The effective impedance varying means may comprise switch means switchable between two states, the effective impedance of the signal circuit when the switch means is in the first state being greater than the effective impedance of the signal circuit when the switch means is in the second state. The switch means may be provided across the isolation joint. The switch means may be arranged to short across the isolation joint when in the second state. The switch means may be a simple switch, the two states corresponding to open circuit and short circuit. The switch means may comprise charge storage means. Preferably, the charge storage means is operable to change the effective impedance of the signal circuit in dependence on the state of the switch means.

The switch means can be arranged so that, in use, the charge storage means is charged when the switch means is in one state and is discharged when the switch means is in the other state.

The switch means can be arranged so that, in use, the charge storage means generates a potential difference across the isolation joint. This potential difference can be such that it tends to oppose the reference signal current when the switching means is in one state and/or such that it tends to increase the reference signal current when the switching means is in the other state.

The charge storage means may be, for example, a capacitor or an electric cell.

Preferably the effective impedance varying means is an effective impedance modulation means for modulating the reference signal to encode data to be transmitted and the monitoring means is arranged for decoding data transmitted. This allows more complex data to be transmitted using a single varying means and has the advantage that a large variety of different signals can be sent using only two signal levels. Data can be transmitted as a switched digital signal. Thus to extract data it is only necessary to be able to detect two differing signal levels rather than it being necessary to measure the magnitude of the signals. The monitoring means may comprise decoding means for decoding the data transmitted. The monitoring means may comprise a CPU.

Control means can be provided for acquiring and processing the data to be transmitted and controlling the effective impedance modulating means. The control means can be arranged to accept and process data output by sensors disposed in a desired location. The control means can be arranged to produce an encoded signal representing the data to be transmitted. The control means can be arranged to switch the switch means between its two states in order to modulate the effective impedance of the signal circuit in accordance with the encoded signal representing the data to be transmitted. The control means can comprise a microprocessor.

In developments of the invention the downhole structure or signal channel is provided with a plurality of isolation joints. A plurality of effective impedance modulating means can be provided, each of which may comprise a respective isolation joint.

According to a third aspect of the present invention there is provided a data transmission system comprising, signal generating means for generating and applying to a signal circuit a signal which represents data to be transmitted, wherein the signal generating means comprises a reference signal generating means and modulation means for modulating the reference signal to thereby encode the data to be transmitted, the modulation means comprising effective impedance modulating means for modulating the effective impedance of the signal circuit, and the effective impedance modulating means comprising switch means which is switchable between two states, the effective impedance of the signal circuit when the switch means is in the first state being greater than the effective impedance of the signal circuit when the switch means is in the second state, wherein the switch means comprises charge storage means arranged to enhance the difference in effective impedance between the first and second states.

Monitoring means may be provided for monitoring changes in the reference signal caused by the modulating means.

According to a fourth aspect of the present invention there is provided a pipeline system comprising a conductive pipe for carrying fluid and a data transmission system as defined in more detail above.

According to a fifth aspect of the present invention there is provided a well comprising downhole structure including a conductive pipe for carrying fluid and a data transmission system as defined in more detail above.

Many of the preferred features introduced in relation to the first and second aspects of the invention are equally applicable as preferred features of the third, fourth and fifth aspects of the invention.

Embodiments of the present invention will now be described by way of example only with reference to the accompanying drawings in which:

FIGS. 5a to 5c are a side view, a plan view, and an end view of a carrier for the downhole station of FIG. 3;

FIG. 5d is a section on line A—A in FIG. 5a;

FIG. 5e is a section on line B—B in FIG. 5a;

Figure 1:
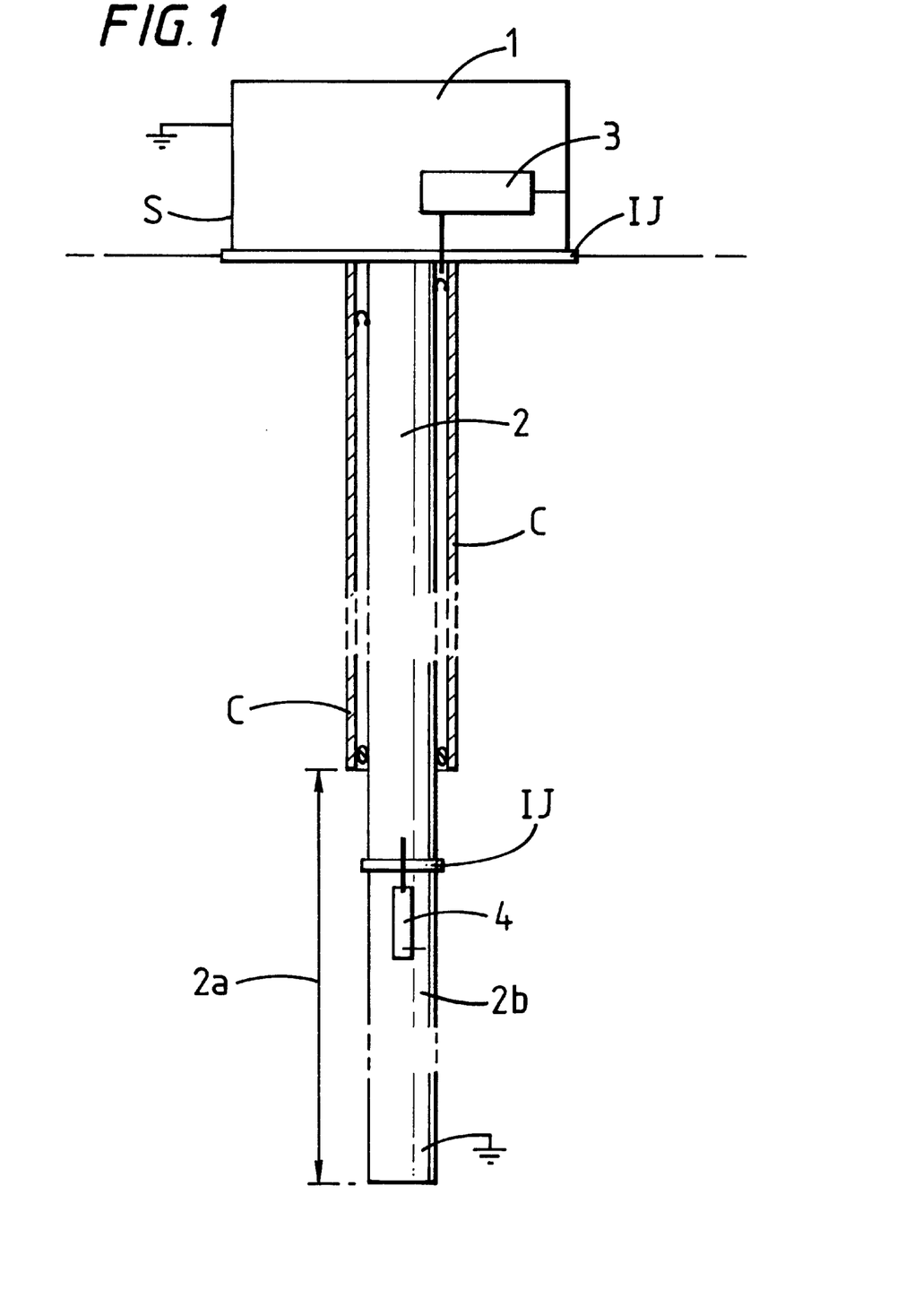
FIG. 1 is a schematic view of a well comprising a downhole data transmission system.

FIG. 1 shows a well which generally comprises a wellhead (1) one or more production strings (2) and associated casing (C). The production string (2) is disposed within the casing (C) for the majority of its length but in normal operation the extreme end of the production string (2) will project beyond the casing (C) to form an exposed portion (2a). The metallic structure (S) of the wellhead (1) is electrically isolated from the downhole structure, which comprises the casing (C) and the production string (2), by a wellhead isolation joint (IJ). The production string (2) and casing (C) are themselves electrically connected so that the casing (C) and the production string (2) are treated as a single conducting channel.

A downhole isolation joint (IJ) is provided in the exposed part (2a) of the production string (2). The downhole isolation joint (IJ) electrically isolates an earth portion (2b) of the production string (2) from the remainder of the downhole structure (2,C).

The well further comprises a wellhead station (3) and a down hole station (4) which comprise all the sensors and electronic circuitry required for obtaining data regarding the well and transmitting data between the wellhead station (3) and downhole station (4).

Figure 2:
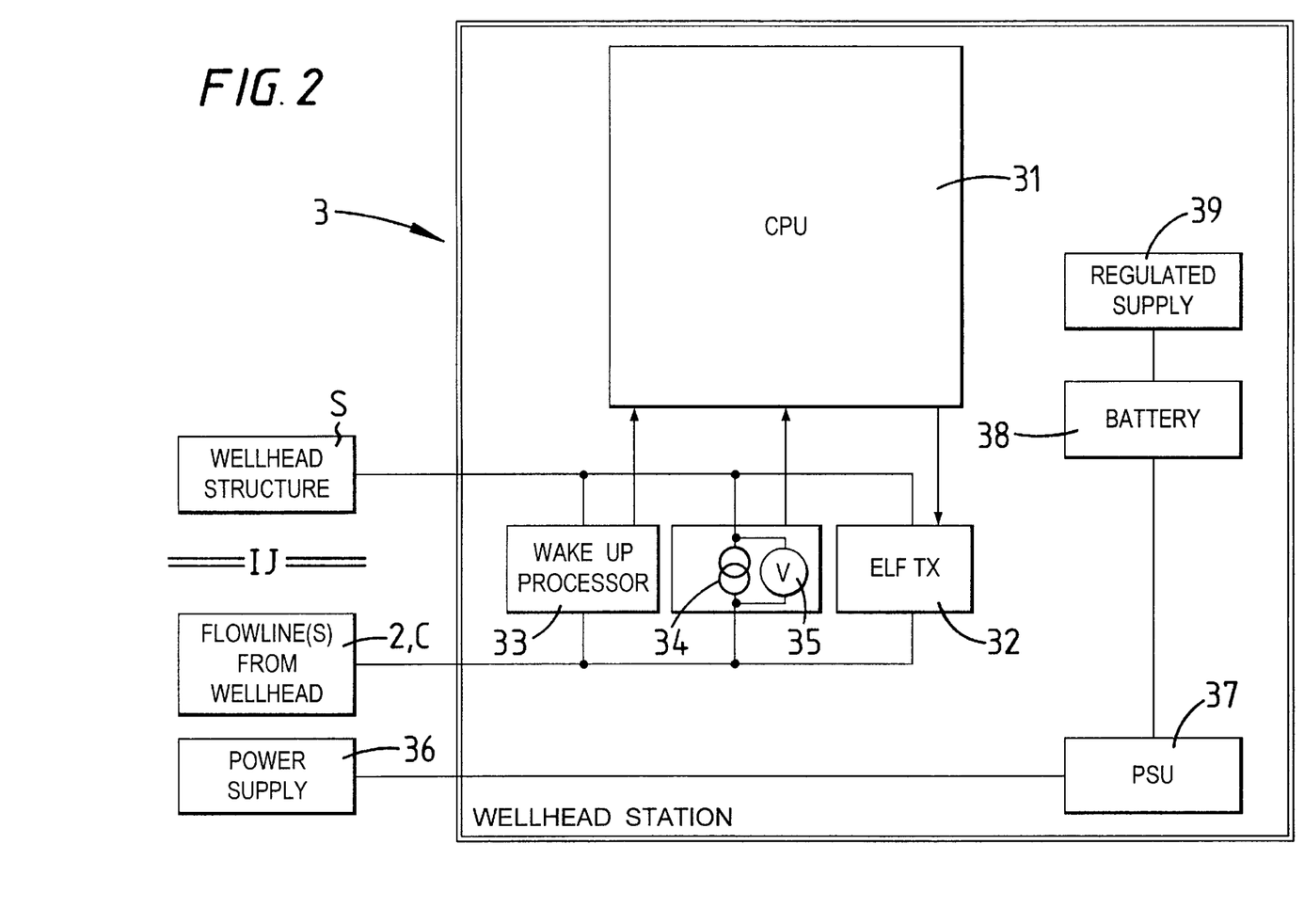
FIG. 2 is a schematic view of a wellhead station of the downhole data transmission system shown in FIG. 1.

Referring to FIG. 2, the wellhead station (3) comprises a central processing unit (CPU) (31), an extremely low frequency (elf) transmitter (32) which is controlled by the CPU (31) and which is connected across the wellhead isolation joint (IJ). One terminal of the transmitter (32) is connected to the wellhead structure (S) and the other terminal is connected to the downhole structure (C,2). The wellhead structure (S) provides a connection to earth which is electrically isolated from the downhole structure (C,2) and free from electrical influence to complete the return path. Alternatively a connection can be made directly to earth, to a sea water electrode or to a pipeline.

A wake-up processor (33) for controlling the CPU (31) is also connected across the wellhead isolation joint (IJ).

A current source (34) which can be implemented, for example, using semiconductor technology is connected across the wellhead isolation joint (IJ). One terminal is connected to the wellhead structure (S) and the other terminal is connected to the downhole structure (2, C). Voltage measuring means (35) are connected across the current source (34). The output of the voltage measuring means (35) is connected to the CPU (31).

The wellhead station (3) draws it power from an external source (36) and is provided with a power supply unit (37), a battery (38) and a regulated supply (39) for supplying power to all the components provided in the wellhead station (3).

Figure 3:
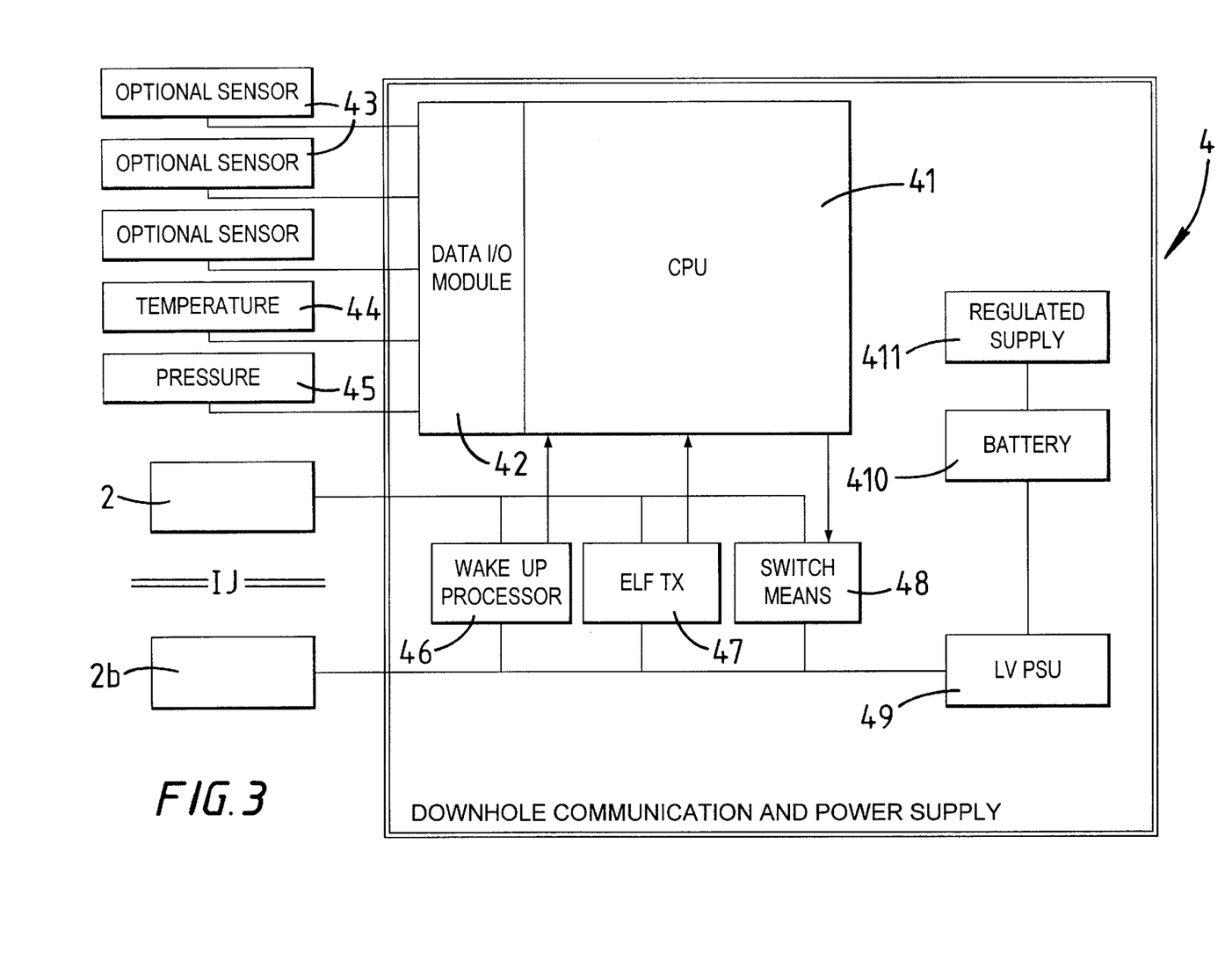
FIG. 3 is a schematic view of a downhole station of the downhole data transmission system shown in FIG. 1.

Referring to FIG. 3, the downhole station (4) comprises a CPU (41) which has an associated data input/output module (42) which in turn is connected to optional sensors (43), a temperature sensor (44) and a pressure sensor (45).

The downhole station also comprises a wake-up processor (46) which controls the CPU (41), an extremely low frequency receiver (47) an output of which is connected to the CPU (41) and a switch means (48) which is controlled by the CPU (41). The wake-up processor (46), the extremely low frequency receiver (47) and the switch means (48) are connected across the downhole isolation joint (IJ). One terminal of each of these three devices is connected to the main part of the production string (2) and the other terminal of each is connected to the earth portion (2b). The switch means has a closed position in which the downhole isolation joint (IJ) is shorted out so that a conduction path exists from the main part of the production string (2) to the earth portion (2b) and an open position in which no such conduction path exists.

The downhole station (4) further comprises a low voltage power supply unit (49), a battery (410) and a regulated power supply (411) for providing power to all of the devices located in the downhole station (4). However, the low voltage power supply unit (49) does not have to supply the power required for transmitting data to the well head station (3).

Figure 4:
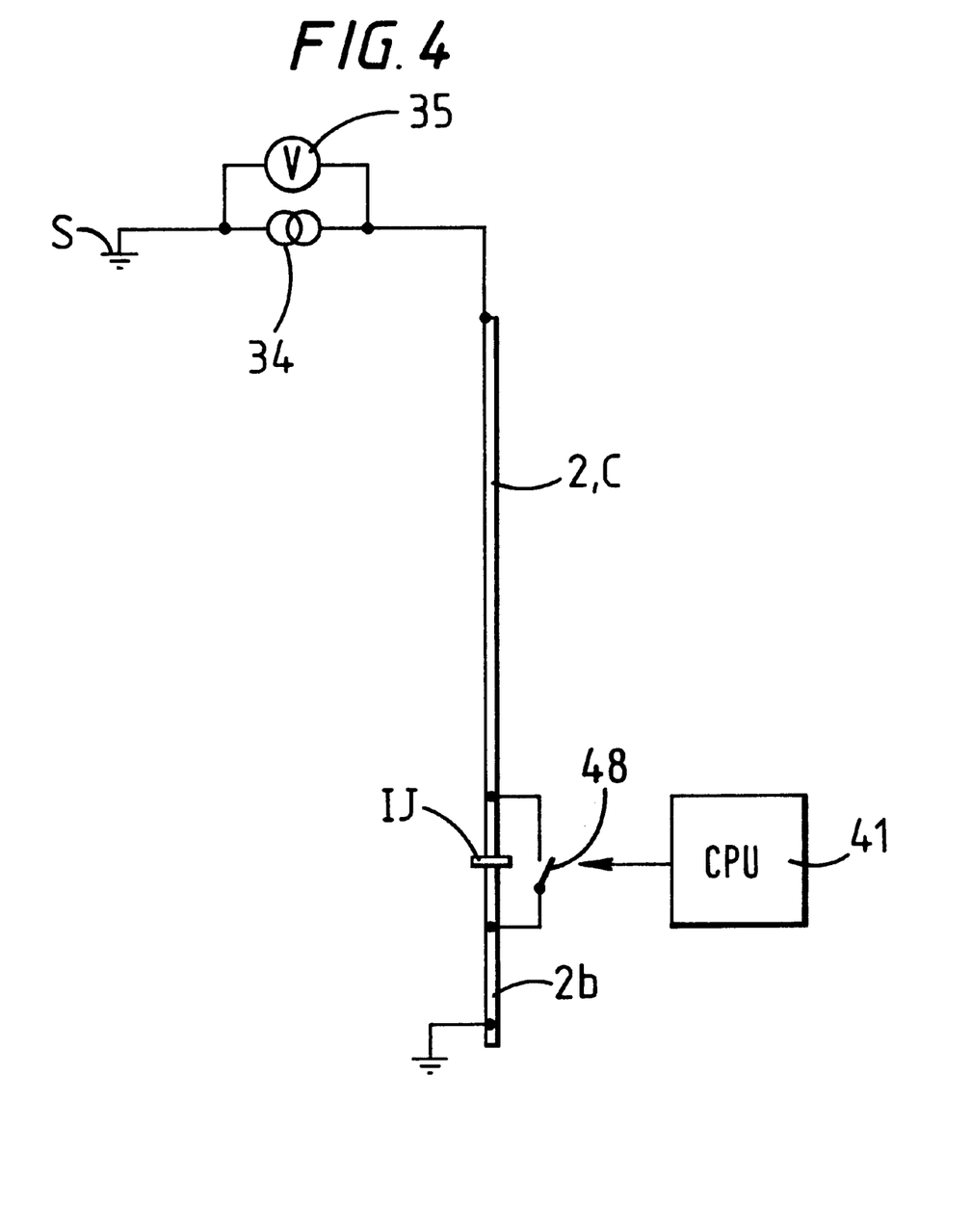
FIG. 4 is a simplified schematic view of the downhole data transmission system shown in FIG. 1.
Figure 5A:
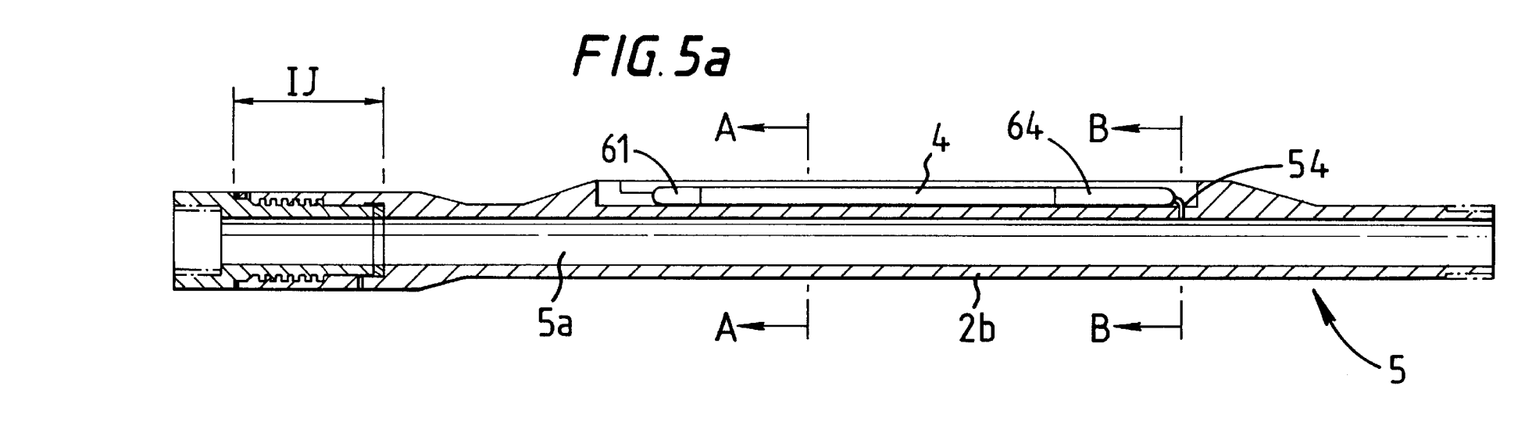
Figures 5B, 5C, 5D, 5E:
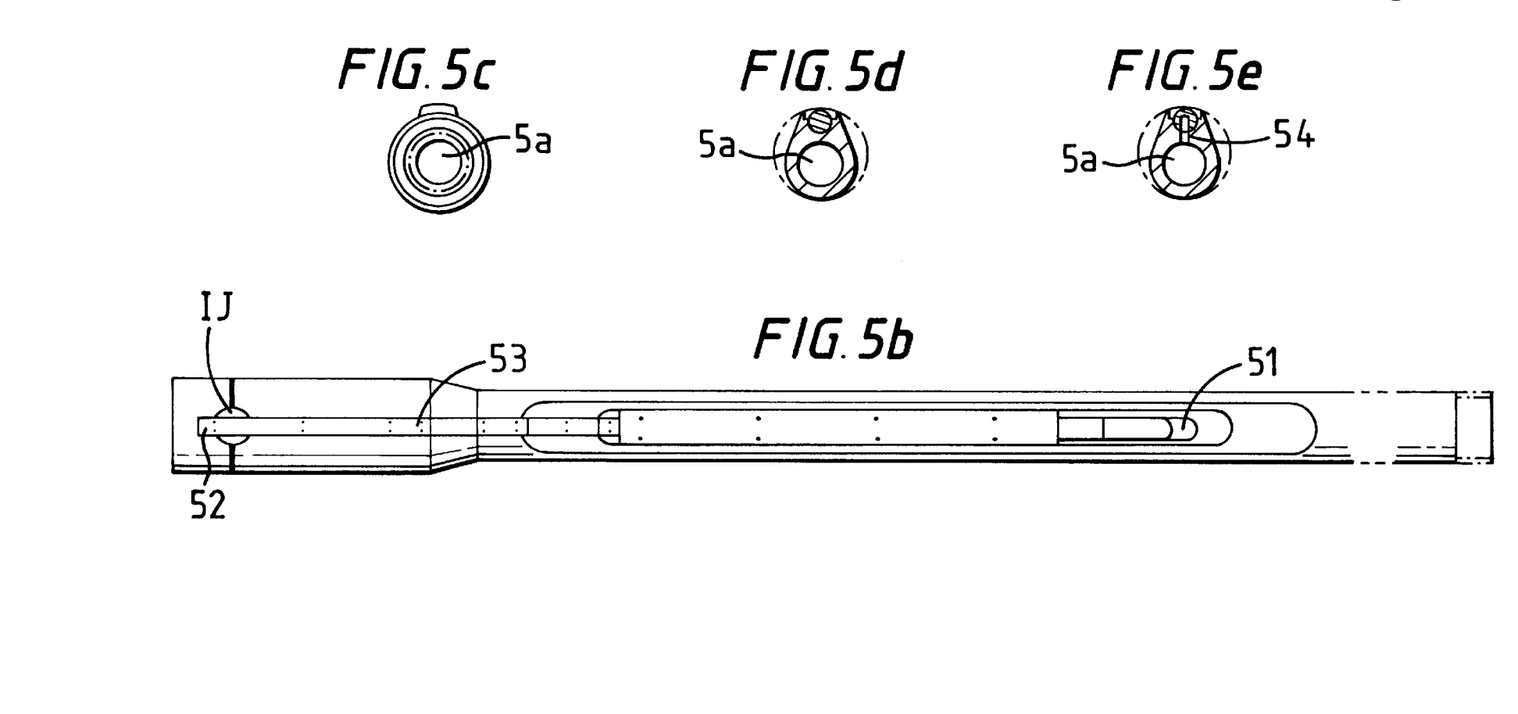

FIG. 4 shows a simplified diagrammatic view of the data transmission system for assisting in gaining an understanding of the mechanism for transmitting data from the downhole station (4) to the wellhead station (3).

FIGS. 5a to 5e show a carrier (5) in which a module comprising the downhole station (4) can be disposed. The carrier (5) is arranged to be disposed in the production string (2) and has a central bore (5a) through which product extracted from the well can pass. An electrical connection (51) is provided between the downhole station (4) and the carrier (5) which forms part of the earth portion (2b) of the production string. Similarly an electrical connection (52) is provided to the main part of the production string (2) via an enclosed cable route (53) which crosses the downhole isolation joint (IJ). An internal pressure port (54) is provided so that the pressure sensor (45) can be used to measure the pressure within the bore (5a).

Figure 6:
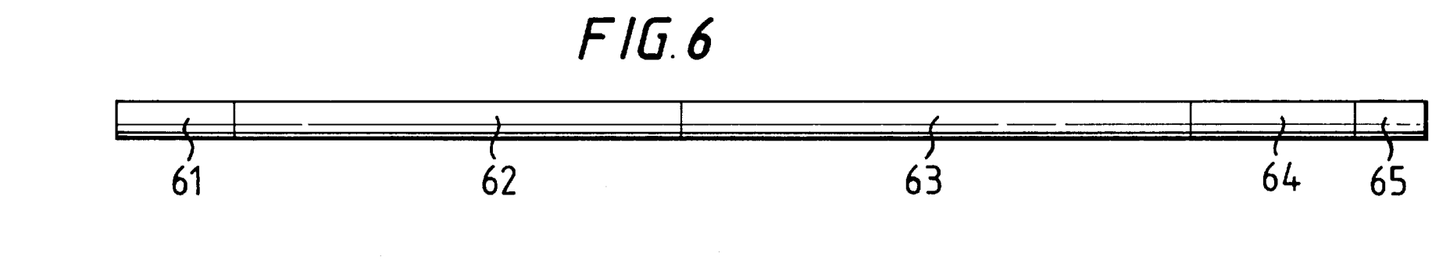
FIG. 6 is a schematic view of a module containing the downhole station shown in FIG. 3.
Figure 7:
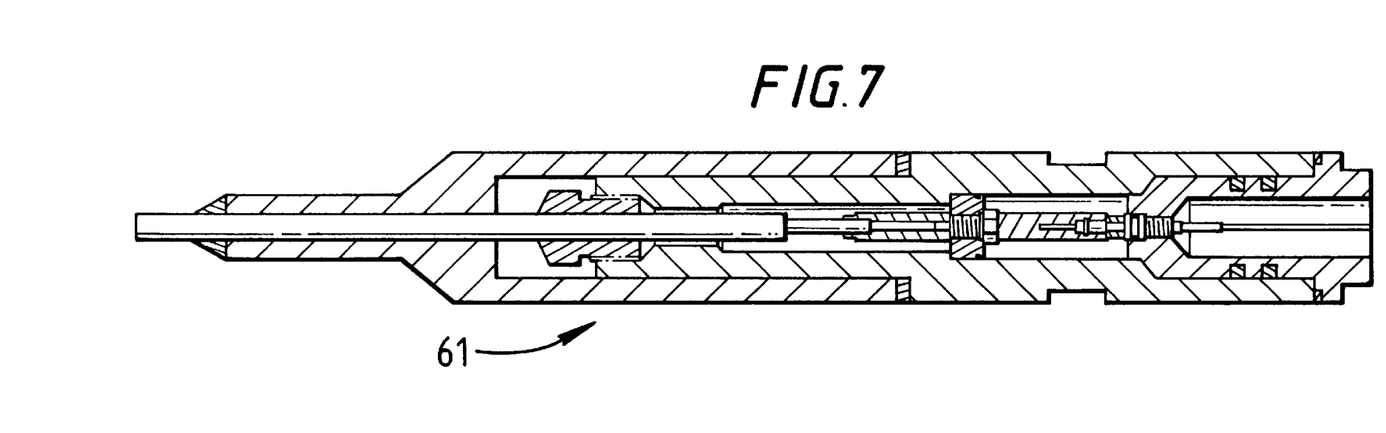
FIG. 7 is a sectional view of a cable head of the module shown in FIG. 6.

FIG. 6 shows the construction of the module used as the downhole station (4) which comprises a cable head (61), a power section (62), a telemetry module (63), a pressure and temperature sensor section (64) and a process connection (65). FIG. 7 shows the detailed construction of the cable head (61).

In operation to minimise the energy requirements both the wellhead station (3) and the downhole station (4) are controlled by the respective wake-up processors (33) and (46). The wake-up processors (33, 46) are the only components which require continuous power supply and are arranged to power up the rest of the respective stations (3, 4) once they have received an appropriate input.

When data is to be transmitted from the wellhead station (3) to the downhole station (4) the wake-up processor (33) first activates the CPU (31) which then causes the elf transmitter (32) to apply a modulated elf signal to the downhole structure (2,C) which represents the data to be transmitted. During this process the modulation occurs across the wellhead isolation joint (IJ) and the connection to the wellhead structure (S) is used as an earth. The signal travels along the downhole structure (2,C) as far as the downhole isolation joint (IJ) at the downhole station (4).

The wake-up processor (46) and elf receiver (47) in the downhole station (4) monitor the downhole structure (2,C) for transmitted signals using the earth provided by the earth portion (2b) of the production string as a reference. When an appropriate signal is received, the CPU (41) can be activated to decode the transmitted data and take the appropriate actions. The wake-up processor (46) can be arranged so that it only activates the CPU (41) when the signal detected includes an address or a tone which the wake-up processor (46) recognises.

The sensors (43, 44 and 45) provided in the downhole station can be used to measure quantities of interest at certain predetermined time intervals and/or in response to instructions transmitted from the wellhead station (3). The mechanism for transmitting the data obtained from the sensors (43, 44 and 45) to the wellhead station (3) is different from that used to transmit data from the wellhead station (3) to the downhole station (4).

The signal generating means used to apply the signal to the downhole structure (2,C) for transmitting data from the downhole station (4) to the wellhead station (3) comprises two distinct parts disposed in two distinct locations. The current source (34) in the wellhead station acts as a reference signal generating means and the switch means (48) controlled by the CPU (41) in the downhole station (4) acts as modulation means, more particularly effective impedance modulating means.

Figure 8:
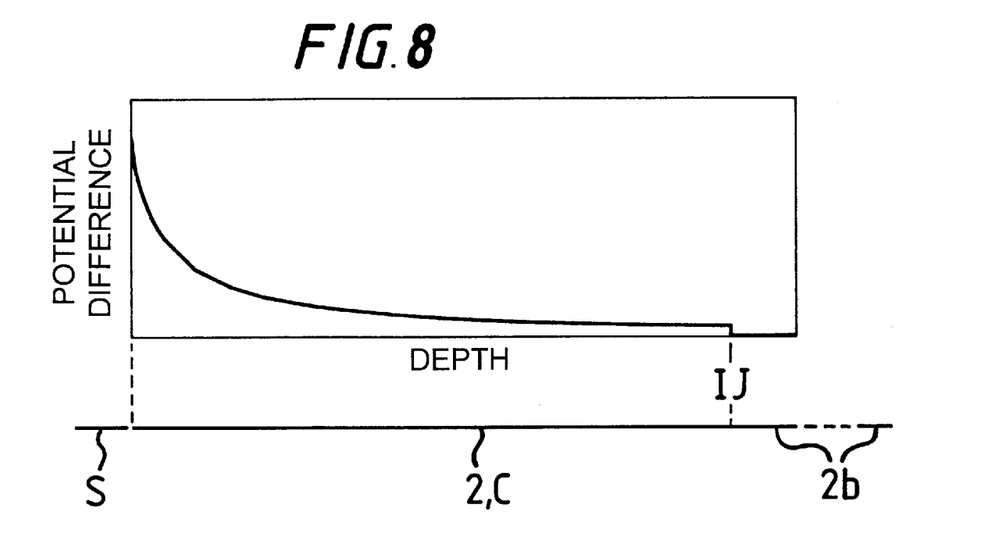
FIG. 8 is a graph showing the voltage distribution along the downhole structure of the well shown in FIG. 1.

The current source (34) supplies a reference signal which is a constant dc current to the section of downhole structure (2,C) between the wellhead and downhole isolation joints (IJ). In the normal condition with the switch means (48) open, the wellhead structure (S) and the earth portion (2b) of the production string are electrically isolated from this section of the downhole structure (2,C) by the isolation joints (IJ) and act as earths. The section of the downhole structure (2,C) between the isolation joints (IJ) is not perfectly insulated from its surroundings (ie earth) so current leaks and the potential difference between the downhole structure (2,C) and earth steadily falls along the length of the downhole structure (2,C) to a certain value at the downhole isolation joint (IJ). When the switch means (48) is open there is zero potential difference between the earth portion (2b) of the production string and earth and a resultant potential difference exists across the downhole isolation joint (IJ). The voltage distribution along the downhole structure (2,C) when the switch means (48) is in the open position is schematically shown in FIG. 8.

With the switch means (48) in the open position there will be an essentially constant voltage drop (open voltage) across the current source (34). The voltage measuring means (35) detects this open voltage and sends an appropriate signal to the CPU (31).

When the switch means (48) is in the closed position, although the wellhead structure (S) is still isolated from the downhole structure (2, C), the earth portion (2b) is electrically connected to the remainder of the production string (2) via the switch means (48). This changes the impedance of the signal circuit comprising the downhole structure (2, C) and the earth returns and produces a corresponding change in the voltage produced across the current source (34). The voltage drop across the current source (34) when the switch means is closed (closed voltage) is essentially constant but is different from the open voltage. The voltage measuring means (35) detects this closed voltage and sends an appropriate signal to the wellhead CPU (31).

Data is transmitted from the downhole station (4) by modulating the impedance of the signal circuit by opening and closing the switch means (48) at the downhole station (4) and detecting the resulting changes in voltage across the current source (34) at the wellhead station (3).

When the downhole station (4) transmits data, the downhole CPU (41) encodes the data to be sent and operates the switch means (48) to modulate the impedance of the signal circuit in accordance with the encoded data. The voltage measuring means (35) at the wellhead station (3) detects the changing voltage and outputs appropriate signals to the wellhead CPU (31) which decodes the signal received to extract the desired data.

The data can be encoded using digital dc signalling in which, say, the open condition corresponds to a zero and the closed condition corresponds to a one. In some circumstances it may only be possible to achieve relatively low data transmission rates but this is not necessarily a problem. Information from the downhole station is typically only required at relatively infrequent, for example monthly, intervals.

The relatively infrequent need to extract data also reduces the problems that might arise due the application of high current (perhaps of the order of 100–1000 Amperes) to the downhole structure. Such currents are likely to be required to receive a satisfactory signal in some circumstances. Applying a positive bias to the structure tends to increase corrosion and applying a negative bias tends to cause hydrogen generation within the metallic structure. It is envisaged that a negative bias would be applied.

Because of the arrangement used for transmitting data from the downhole station (4) no transmitter is required in the downhole station (4). This is a great advantage because when these systems are used in the envisaged environments the power requirements for the transmission of data are high. Problems arise when attempting to meet these energy requirements in a downhole situation especially if the system is to remain operable for an extended period of for example 20 years. It will be appreciated that the CPU (41) and other circuitry in the downhole station requires a relatively low level of power to operate which can be more easily met by a battery or other energy source.

In an alternative a circuit component such as a primary of a transformer is provided in parallel to the simple switch of the switch means (48) so that when the switch is in the open position there is still a conduction path across the downhole isolation joint (IJ). The impedance of the signal circuit will still differ between the closed and open states and a corresponding change in voltage across the current source (34) will still be observed.

In some alternatives a constant peak to peak ac signal can be used as a reference signal. The ac signal should preferably be an extremely low frequency (elf) signal. The ac signal can be used as the primary clock for implementing coherent detection of signals transmitted in either direction or both directions along the downhole structure.

Figure 9:
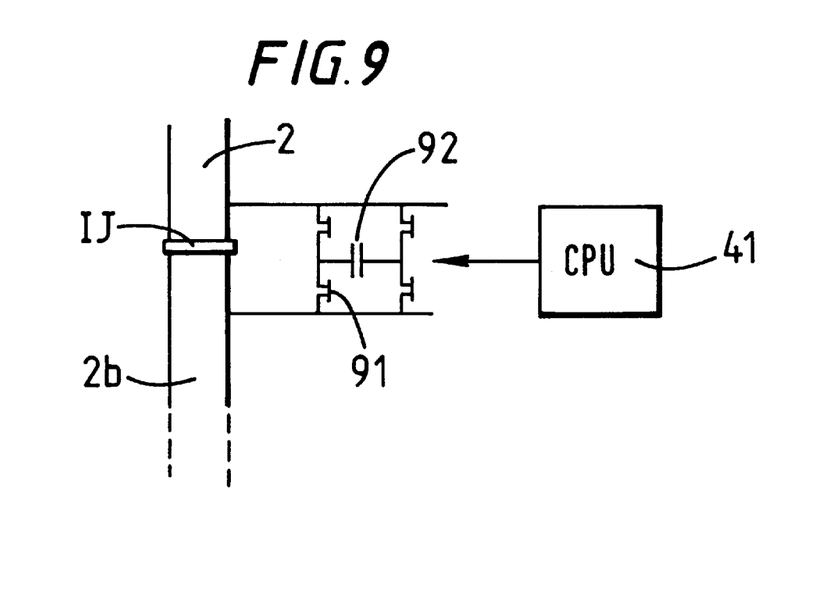
FIG. 9 is a schematic view of an alternative switch means.

An alternative form of switch means is shown in FIG. 9 which comprises four transistors (91) connected to form a bridge and a charge storage means (92) which is a large valued capacitor. The bridge is connected across the downhole isolation joint (IJ) and is controlled by the downhole CPU (41) to modulate the effective impedance of the signal circuit in order to transmit data in the same way as described above. The alternative switch means has two positions each of which causes the signal circuit to have a particular effective impedance and causes a characteristic voltage to be detected across the current source (34). In one position the transistors (91) are switched so that the reference current has to charge up the capacitor, raising the effective impedance. In the other position the reference current tends to discharge the capacitor, lowering the effective impedance. An electric cell can be used in place of the capacitor to give the same effect. This alternative form of switch means is probably only practical when the reference current is dc. The use of a charge storage means (92) and bridge arrangement improves the signal to noise ratio of the received signal at the well head.

Figure 10:
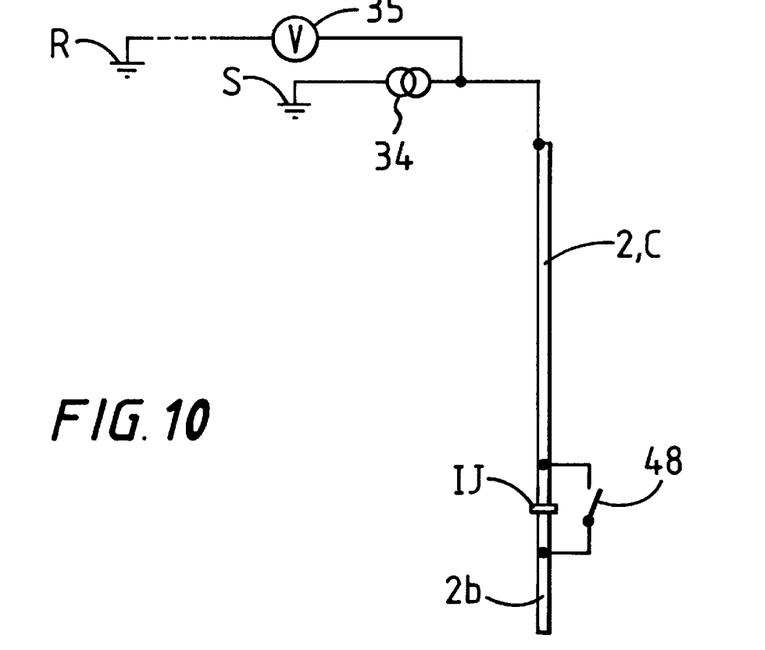
FIG. 10 is a schematic view of a well including a data transmission system with an alternative earthing arrangement.
Figure 11:
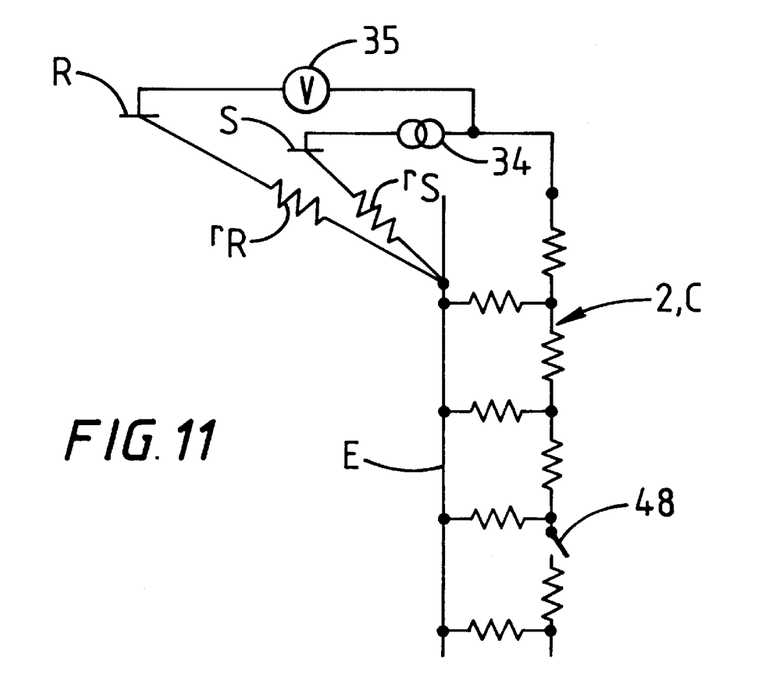
FIG. 11 is a simplified equivalent circuit of the system shown in FIG. 10.

FIG. 10 schematically shows a particularly preferred alternative arrangement which is substantially the same as that described above with reference to FIGS. 1 to 9 with the exception that the voltage measuring means (35) is not connected directly across the current source (34). Rather, one terminal of the voltage measuring means (35) is connected to the output of the current source (34) which is connected to the downhole structure (2, C) and the other terminal of the voltage measuring means (35) is connected to a reference earthing point (R) which is distinct from the wellhead structure (S). On the other hand, the second terminal of the current source (34) is still connected to the wellhead structure (S) (as in the embodiment described with reference to FIGS. 1 to 9) to complete the signal circuit. FIG. 11 shows a simplified equivalent circuit of the arrangement shown in FIG. 10. In this circuit the downhole structure (2,C) and its leakage paths to earth (E) are represented as a ladder network of resistors.

The arrangement of FIGS. 10 and 11 is particularly preferred because the wellhead structure (S) does not represent true earth (E) when the current is being driven around the signal circuit by the current source (34). The current creates a potential difference between the wellhead structure (S) and true earth (E). This can be thought of in terms of there being a finite impedance ($r_S$) between the wellhead structure (S) and true earth (E). As current flows around the signal circuit a voltage exists across the impedance ($r_S$). There are also current leakage paths between the downhole structure (2,C) and the wellhead structure (S) through the surrounding ground. These are of significance because of the close proximity between the downhole (2,C) and wellhead (S) structure. Because of these leakage paths, as the overall impedance of the signal circuit is modified using the switch means (48), the potential difference between true earth (E) and the wellhead structure (S) will vary as well as the potential difference between true earth (E) and the top of the downhole structure (2, C). Thus if the voltage measuring means (35) is connected directly across the current source (34) the change in the potential of the wellhead structure (S) will be detected by the voltage measuring means (35) and this will weaken the signal. However, in the arrangement shown in FIGS. 10 and 11 because a separate reference earthing point (R) is used, this problem is alleviated. The reference earthing point (R) is chosen such that it is less influenced and ideally not influenced, by the leakage currents. This means that the potential difference between the reference earthing point (R) and true earth (E) is more constant and ideally entirely constant.

In this arrangement the impedance ($r_S$) between the wellhead structure (S) and true earth (E) is relatively low, typically of the order of 0.1 ohms. This allows the signal circuit to be completed without unacceptably high voltages building up across the terminals of the current source (34). On the other hand, the impedance ($r_R$) between the reference earth (R) and true earth (E) can be relatively large, for example of the order to 100,000 ohms, without affecting the operation of the signal circuit or the signal value detected by the voltage measuring means (35). As mentioned above, the important point is that the signal being measured by the voltage measuring means (35) is independent of the potential difference between the wellhead structure (S) and true earth (E).

The reference earthing point (R) can be disposed a considerable distance away from the wellhead structure (S) for example, 100 metres. The reference earthing point (R) may be formed by driving a metal stake into the ground.

In further alternatives a number of downhole isolation joints are provided and a downhole station is provided at each isolation joint. The isolation joints can be in one or several separate production strings. In this way measurements can be made at a number of different locations. Data can be transmitted to and from each downhole station in the same way as described above. Each downhole station can have a unique address or tone frequency so that instructions can be directed to a particular station. Any or all of the sections of the downhole structure not being used at a particular time for transmitting a signal can be used as a distributed earth.

A dedicated monitoring section comprising the necessary features including an isolation joint and downhole station to allow data to be recorded, received and transmitted can be provided to replace part or all of a production string. The monitoring section can be arranged for use in a producing well as well as being suitable to be left in and/or introduced into an abandoned well.

In an alternative a section of the earth portion of the production string can be insulated from the surroundings so that the remaining uninsulated portion of the earth portion can act as a remote earth.

In another alternative the well head isolation joint is dispensed with and a separate earth return is provided. It would of course always be possible to provide a separate earth return but when a well head isolation joint and export pipeline is present, using the pipeline as the earth return is the natural option.

In a further alternative a sheath of material different from that of the production string can be provided over the earth portion of the string. This material for example can be copper or Platinised Titanium. The use of Platinised Titanium is probably preferable electrically but may be prohibited on cost grounds or be regarded inadequate in its resistance to abrasion. The use of such a sheath can help to increase the potential difference producible across the downhole isolation joint. This may improve impedance modulation whilst providing a higher voltage supply to the downhole power supply unit when implemented as a simple chemical cell.

What is claimed is:

1. Data transmission apparatus for use with a pipeline system having at least one electrically conductive pipe arranged for carrying a fluid, the data transmission apparatus comprising, a reference signal generator for applying a reference signal to a signal circuit, an effective impedance varier for varying the effective impedance of the signal circuit in dependence on data to be transmitted, the effective impedance varier comprising a switch switchable between first and second states and having associated charge storage device means for changing the effective impedance of the signal circuit in dependence on the state of the switch, the effective impedance of the signal circuit when the switch is in the first state being greater than the effective impedance of the signal circuit when the switch is in the second state, and a monitoring unit for monitoring changes in the reference signal caused by varying the effective impedance of the signal circuit to thereby extract data, wherein the reference signal generator is arranged for applying a signal to a pipe in the pipeline system such that the signal circuit comprises said pipe.

2. The data transmission apparatus of claim 1 wherein the signal circuit comprises a signal channel along which data is transmitted and a return conduction path via ground.

3. The data transmission apparatus of claim 1 wherein the reference signal generator comprises a constant current source.

4. The data transmission apparatus of claim 3 wherein the current source is arranged to generate a constant dc current signal.

5. The data transmission apparatus of claim 3 wherein the monitoring unit is arranged for monitoring changes in the potential difference, due to the reference signal, between a terminal of the current source and ground.

6. The data transmission apparatus of claim 3 wherein the monitoring unit is connected across the terminals of the current source.

7. The data transmission apparatus of claim 3 wherein a separate reference earthing point is provided and the monitoring unit is arranged to monitor the potential difference between an output of the current source and the reference grounding point.

8. The data transmission apparatus of claim 1 being arranged for use in a well having downhole structure, the downhole structure comprising the pipe to which the reference signal generator is connected.

9. The data transmission apparatus of claim 1 wherein the effective impedance varier is an effective impedance modulator for modulating the reference signal to encode data to be transmitted and the monitoring unit is arranged for decoding data transmitted.

10. Data transmission apparatus comprising a signal generator for generating and applying to a signal circuit, a signal which represents data to be transmitted, the signal generator comprising a reference signal generator and modulator for modulating the reference signal to thereby encode the data to be transmitted, the modulator comprising an effective impedance modulator for modulating the effective impedance of the signal circuit, and the effective impedance modulator comprising a switch which is switchable between first and second states, the effective impedance of the signal circuit when the switch is in the first state being greater than the effective impedance of the signal circuit when the switch is in the second state, wherein the switch has an associated charge storage means for enhancing the difference in effective impedance between the first and second states.

* * * * *